Figure 1:
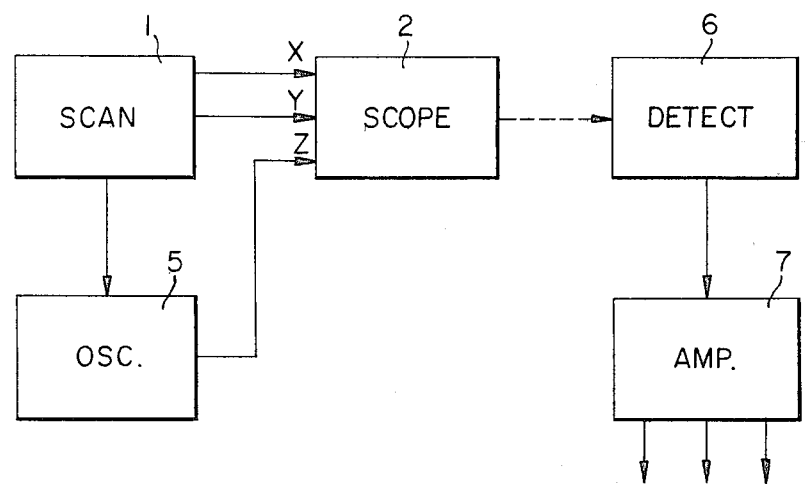

United States Patent [19]

Warner

[11] 4,228,598
[45] Oct. 21, 1980

[54] RADAR SIMULATION APPARATUS

[75] Inventor: Richard T. Warner, London, England

[73] Assignee: The Secretary of State for Defence in Her Britannic Majesty's Government of the United Kingdom of Great Britain and Northern Ireland, London, England

[21] Appl. No.: 834,524

[22] Filed: Sep. 16, 1977

[30] Foreign Application Priority Data

Sep. 21, 1976 [GB] United Kingdom ............... 39152/76

[51] Int. Cl.³ ................................................ G09B 9/00
[52] U.S. Cl. ..................................................... 35/10.4
[58] Field of Search .......................................... 35/10.4

[56] References Cited
U.S. PATENT DOCUMENTS

| | | | |
|---|---|---|---|
| 2,740,205 | 4/1956 | Shamis et al. ........................ | 35/10.4 |
| 3,193,606 | 7/1965 | Anderson ............................. | 35/10.4 |
| 3,221,091 | 11/1965 | Franklin et al. ..................... | 35/10.4 |
| 3,278,670 | 10/1966 | Eisenberg et al. ................... | 35/10.4 |
| 3,300,568 | 1/1967 | Sear ...................................... | 35/10.4 |

*Primary Examiner*—T. H. Tubbesing
*Attorney, Agent, or Firm*—Cushman, Darby & Cushman

[57] ABSTRACT

According to the invention there is provided radar simulation apparatus comprising an oscilloscope having a display screen, said oscilloscope producing a luminous movable screen spot, scanning means connected to the oscilloscope for causing the spot to be scanned over said screen in a radar transmitter type scanning pattern, a photo-detector mounted in front of the screen for detecting light from said spot only when said spot is near the photo-detector and for producing an electrical signal when said light is detected, and modulation means connected to receive and modulate said electrical signal in simulation of a radar pulse repetition.

5 Claims, 4 Drawing Figures

FIG. 4.
(a)
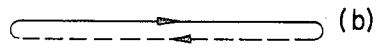(b)
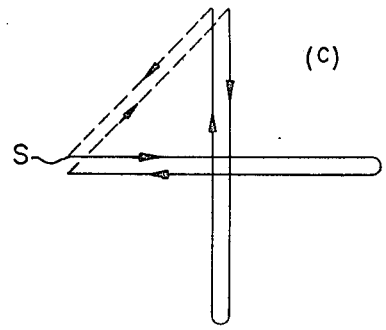(c)
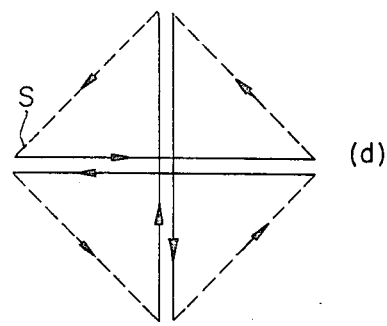(d)
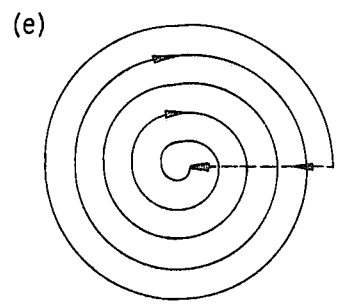(e)
(f)
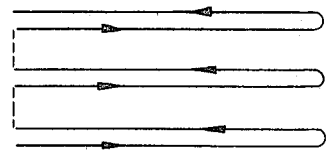(g)
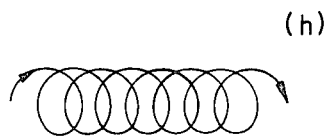(h)
(i)

RADAR SIMULATION APPARATUS

This invention relates to apparatus for simulating a radar environment.

A known type of apparatus for simulating a radar environment uses prerecorded magnetic tapes bearing signals whose strength and repetition frequency correspond to the strength and repetition frequency of radar signals as they might be received at some location. One possible way of preparing such tapes is to place a radar receiver in position by a radar transmitter, or, if that is what it is required to simulate, to move a radar receiver past a radar transmitter, and to record on tape the received signals, after they have been through a detection stage. This method of preparing tapes suffers from the disadvantage that it may not always be possible to obtain access to radar transmitters of the type which it is required to simulate. For example it may be required to simulate an environment produced by a type of radar transmitter which is still being designed, or which is mainly installed in places, such as busy commercial airports, where the presence of recording equipment for extended periods and in positions chosen with a view to obtaining desired recordings and not necessarily convenient for the running of the airport, would be intolerable. It is also known to use a computer to produce the signals. Because of the high capital cost of the computer this technique is mainly used to prepare tapes rather than for direct simulation. In practice it is found that a considerable effort is needed to program the computer to produce signals which adequately simulate a desired radar environment.

According to the present invention there is provided apparatus for simulating a radar environment comprising an oscilloscope having a display screen and having scanning means for applying scanning signals for causing a luminous spot to be scanned over the screen to produce a scanning pattern such as is used in a radar transmitter, photo-detector means mounted on or adjacent the screen to detect light from the spot when the spot comes near to the photo-detector and to produce an electrical signal in response thereto and modulation means for modulating the electrical signal in such manner as to simulate radar pulse repetition.

The modulation means may be arranged to modulate the intensity of the spot on the screen. For example it may be connected to apply signals to a Z-modulation input of the oscilloscope.

The photo-detector may comprise a photo transistor. An opaque mask with a hole in may be interposed between the screen and the photo-detector. The photo-detector may comprise an array of photo-sensitive devices, such as photo transistors, with their outputs combined, so as to simulate a wide radar beam or receiver aperture.

Displacing means may be provided for causing the scanning pattern to move relative to the screen, and thus to be displaced relative to the photo-detector. The displacing means may include a joystick control.

The electrical signal produced by the apparatus may be used to produce pre-recorded tapes for use in simulator apparatus of the known type described, or it may be used directly in a simulation exercise. When used directly, the apparatus has the advantage that operators being trained can see the spot moving over the screen at the same time as they receive the simulated signal. Thus, they can see what kind of scan is being simulated, and where in the scan pattern they are supposed to be, at the same time as they hear audible signals such as would be produced by a radar receiver, and thus they can more readily appreciate the connection between the sounds they hear, and the situation they are supposed to be in. This visualisation of the scanning beam which the invention provides is also advantageous when the invention is being used to prepare pre-recorded tapes. Experience with computer simulation has shown that a first attempt at a simulation is rarely very successful. Usually an experienced operator will listen to the recording, or monitor it, and suggest alterations which then have to be programmed, and so on until a satisfactory recording is produced. With the present invention the experienced operator can make adjustments to the apparatus and at the same time visualise the effect of his adjustments. For example he can vary the gain of the oscilloscope deflection channels or defocus the spot so as to make it larger, and he can immediately see as well as hear the effect of what he has done. This gives the operator a better feel for the adjustments he has to make, compared with keying numbers into a computer, and makes his task easier.

Figure 2:
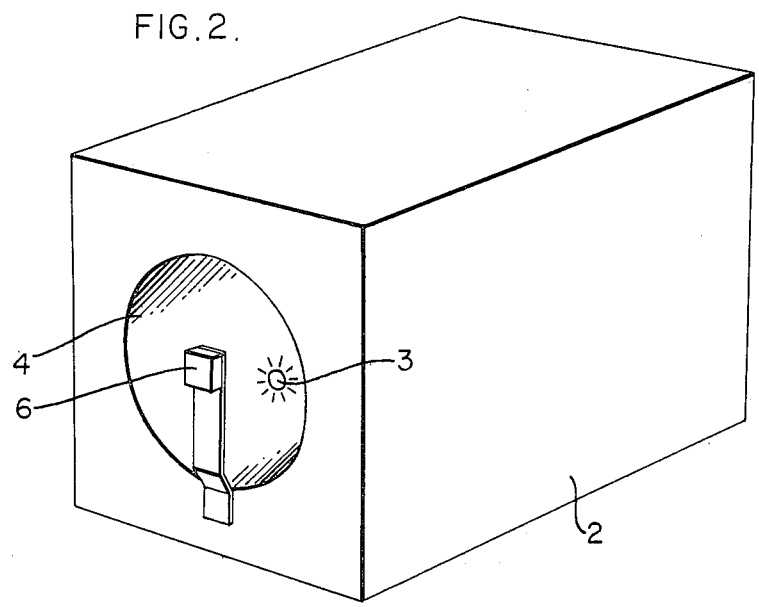
Figure 3:
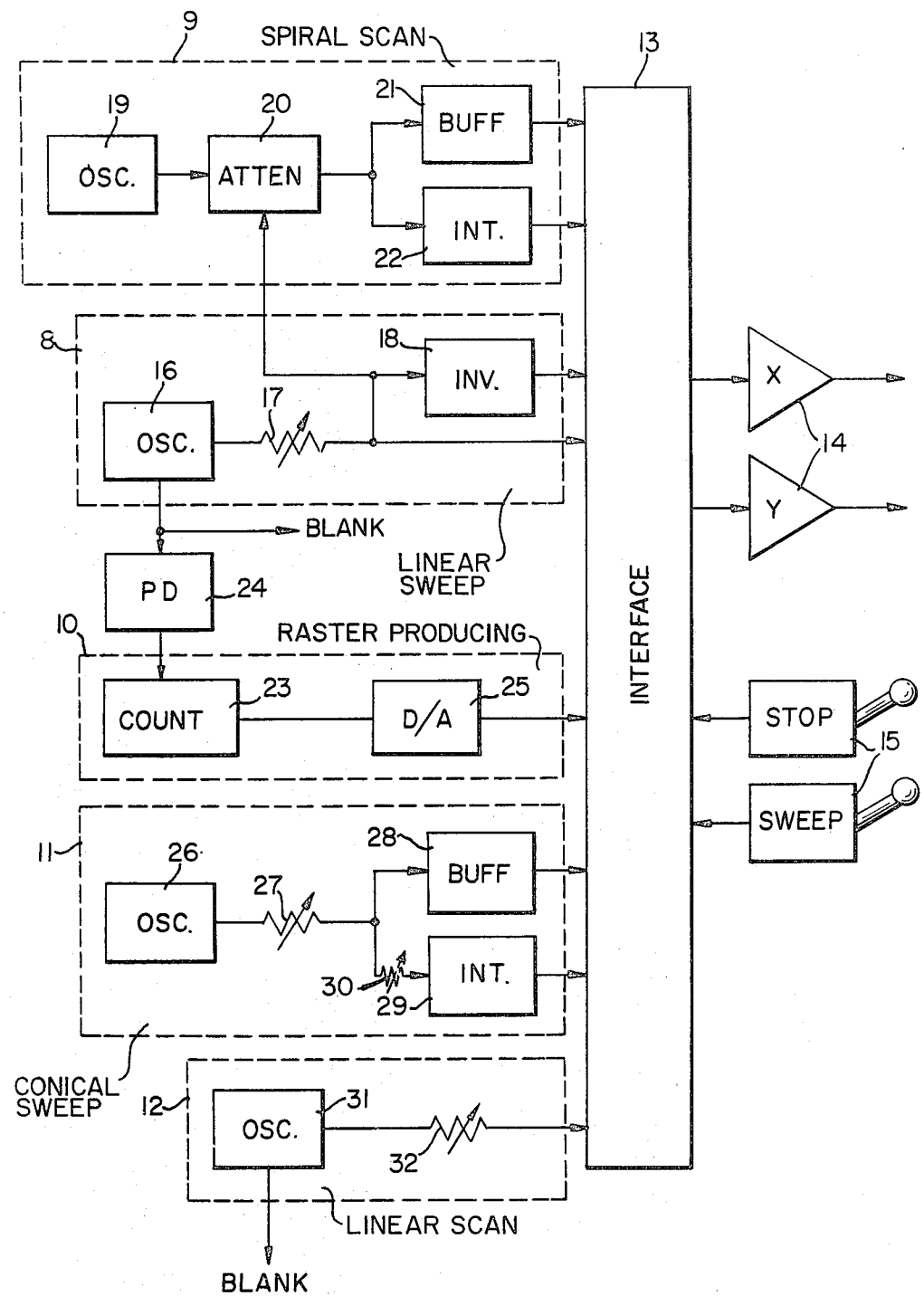

An embodiment of the invention will now be described by way of example with reference to the drawings accompanying the provisional specification, of which:

FIG. 1 shows in schematic form the general electronic layout of an embodiment of the invention, FIG. 2 shows a perspective view of an oscilloscope and photo-detector forming part of the embodiment of FIG. 1, FIG. 3 shows a schematic circuit diagram of a scan-control circuit forming part of the embodiment of FIG. 1, and FIG. 4 illustrates some scan patterns produced by the circuit of FIG. 3.

In FIG. 1 a scan-control circuit 1 is connected to apply signals to an X-deflection and a Y-deflection input of an oscilloscope 2 also depicted in FIG. 2. The scan-control circuit 1 acts as a scanning means to cause a bright spot 3 on the screen 4 (both in FIG. 2) of the oscilloscope 2 to move about the screen 4 following a chosen one of a selection of radar-type scan patterns. A pulse generating oscillator 5 is connected to apply a stream of pulses at a selectable frequency, each pulse being of about fifty microseconds duration, to a Z-modulation input of the oscilloscope 2. The frequency of the oscillator 5 is adjustable over the range of frequencies used as pulse repetition frequencies in radars. The oscillator 5 comprises a voltage-controlled oscillator with a feed-back connection from the output pulse stream via a bistable divide-by-two circuit to a pair of field effect transistors which act as switches, opening alternately to apply two voltages alternately as frequency-control voltages. The oscillator 5 will thus produce, if desired, a pulse stream with a limping or iambic rhythm as used by some radars. If the two selectable voltages are set equal to one another the pulse stream will be regular. The scan-control circuit 1 is connected to apply blanking signals to the oscillator 5 to inhibit the pulse stream during fly-backs of the scans.

A photo-detector 6 (FIGS. 1 and 2), comprising an array of phototransistors contained in a light-shielding container with a hole in it, is mounted centrally in front of the screen 4 (FIG. 2) of the oscilloscope 2 so as to receive light from the spot 3 (FIG. 2) as it passes. The photodetector 6 produces electrical signals in response to the light, which are then led to an amplifier 7. The amplifier 7 has several outputs, one for a loudspeaker for monitoring and for use in direct demonstrations, and a set for a tape recorder, and it may also have other outputs, such as a modulation output for a radar-frequency signal generator.

The construction and operation of the scan-control circuit 1 of FIG. 1 will now be described with reference to FIG. 3. Two main-scan producing circuits, a linear-sweep circuit 8 and a spiral-scan circuit 9, a raster producing circuit 10, and two secondary-scan producing circuits, a conical-scan circuit 11 and a linear-scan circuit 12, all produce electrical output signals which are led to an interface circuit 13. The interface circuit 13 comprises field effect transistors acting as switches and directs selected combinations of the signals to a pair of amplifiers 14 which respectively provide outputs for X-deflection and Y-deflection. The interface 13 also adds to the signals direct voltages controlled by a pair of joystick controls 15 which are respectively a "sweep" control and a "stop" control. The sweep control provides voltages while one of the main scans is being passed to the oscilloscope and acts to control the position of the centre of the scan pattern. The stop control provides voltages when no main scan is being passed to the oscilloscope and acts to control the position of the spot, or of the secondary scan if any.

The linear-sweep circuit 8 comprises a voltage-controlled oscillator 16 constructed to produce a square wave output and at the same time either a triangular or sawtooth output as selected. The triangular or sawtooth output is led through an attenuator 17 and thence both directly and also via an inverter 18 to the interface circuit 13. The square wave output provides a blanking signal for blanking during flybacks of the main sweep.

With the triangular output selected, and an output of the linear-sweep circuit 8 connected to the X-deflection input of the oscilloscope, the spot will perform a movement simulating a radar sector scan. This is illustrated in FIG. 4 (a). The spot moves from left to right along a straight line, and then back again and so on. In FIG. 4(a) as in FIG. 4(b), (c) and (d), successive passages of the spot along the same line have been shown slightly separated for clarity whereas in fact there is no such separation. With the sawtooth output selected the spot will simulate a unidirectional sector (UDS) scan. This is shown in FIG. 4(b). The spot moves from left to right along a straight line and then flies back to the left. Flybacks throughout FIG. 4 are shown by dotted lines and it is to be understood that the spot is blanked out during all flybacks. If the signals were applied to the Y-deflection input the scans would be in the vertical direction instead of the horizontal, and if the signal from the inventer 18 were used the directions of the scans would be reversed. By suitable switching in the interface circuit 13, therefore, more complex scans can be produced. FIG. 4(c) illustrates an alternating sector scan. Starting from the point marked S the spot moves from left to right and back again and then flies to the top, whence it moves down and up again and then flies back to the left to begin again from S. FIG. 4(d) illustrates an interleaved sector scan. Starting from S the spot moves to the right, flies to the top, moves down to the bottom, flies to the right-hand side, moves to the left, to S, flies to the bottom, moves up to the top, and then flies back to S to begin again. The alternating and interleaved sector scans are suitable scans for use in precision approach path radars. A very slow UDS scan can be used to simulate a circular scan, as produced by a rotating antenna.

The spiral-scan circuit 9 comprises a variable-frequency sine-wave oscillator 19 whose output is passed through an electronically controlled attenuator 20 which receives as control signal the output from the oscillator 16 via the attenuator 17. The output from the attenuator 20 is connected via a buffer amplifier 21 and also via an integrator 22 to produce a ninety degree phase shift, to the interface 13.

With the two outputs from the spiral-scan circuit 9 connected to the X-deflection and Y-deflection inputs respectively of the oscilloscope, and with the sawtooth output of the oscillator 16 selected, the spot will simulate a spiral scan. This is illustrated in FIG. 4(e). The spot starts near the centre of the pattern, spirals outwards, and then flies back to the starting point near the centre to begin again.

The raster-producing circuit 10 comprises a counter circuit 23 which is connected to receive incrementing pulses from the square-wave output of the oscillator 16 via a pulse-rate doubling circuit 24 which may be rendered active or inactive as desired. The counter 23 is adapted to count modulo some preset number, which is the number of lines in the raster, in preset increments, which may be positive or negative. The output of the counter 23 is led, via a digital-to-analogue converter 25, to the interface 13.

The raster-producing circuit 10 is used in combination with the linear-sweep circuit 8 to produce a raster scan. For example, with an output of the linear-sweep circuit 8 applied to the X-deflection input and the output of the raster-producing circuit 10 applied to the Y-deflection input of the oscilloscope, with the triangular output of the oscillator 16 selected, and the pulse-rate doubling circuit 24 rendered active, a scan such as that illustrated in FIG. 4(f) will be produced. The spot moves from left to right, flies up a little, moves from right to left, flies up a little more and so on. When the preset number of lines have been scanned the spot flies back to the starting point to begin again. If the sawtooth output of the oscillator 16 had been selected the movements of the spot would have been all one way, say from left to right, with flyback up a little and to the left in between movements. With an odd number of lines set and an increment of two an interleaved raster scan, as in a television picture, is achieved. With the pulse-rate doubler 24 rendered inactive, a bidirectional raster pattern is achieved, in which the spot moves to and fro across the screen, say from left to right and back again, begore flying up, as illustrated in FIG. 4(g).

The conical-scan circuit 11 comprises a variable frequency sinewave oscillator 26 connected via an attenuator 27 to the inputs of a buffer amplifier 28 and an integrator 29, from both of which the outputs are led to the interface 13. The integrator has an attenuator 30 to provide adjustment of the ellipticity of the conical scan.

The linear-scan circuit 12 comprises a variable-frequency sawtooth oscillator 31 connected via an attenuator 32 to the interface 13. A square-wave output from the oscillator 31 provides a blanking signal.

The secondary-scan producing circuits 11 and 12 produce secondary scanning movements which are superimposed on the main scanning movements already described with reference to FIG. 4(a) to (g). The conical scan is illustrated in FIG. 4(h). A clockwise circular movement is superimposed on a linear motion of the spot from left to right, producing a cycloidal movement. The linear secondary scan is illustrated in FIG. 4(i). The spot is making a scanning movement from left to right, but at the same time there is a vertical secondary scan movement, so the path followed by the spot consists of a horizontal series of short upward excursions, each inclined to the right, and with a downward flyback between successive excursions. The linear secondary scan is most suitable for use with main scans comprising linear sweeps as illustrated in FIG. 4(a) to (g). The direction of the linear secondary scan is at right angles to the direction of the main scan, as in FIG. 4(i), so that when the main scan sweep signals are applied to the X-deflection input the linear secondary scan signals are applied to the Y-deflection input and vice versa. The conical secondary scan is suitable for use with main scans of either spiral or linear type.

The interface 13 has a "stop" facility whereby the operation of the main scan may be stopped and the spot, with a secondary scan if desired, directed to a position selected by the stop control 15.

A number of modifications to the embodiment described, falling within the scope of the invention, will be apparent to a person skilled in the arts to which this invention relates. For example provision may be made for an external pulse-repetition oscillator to be used in place of the one provided and indicated at 5 in FIG. 1. The external pulse-repetition oscillator could, for example, be used to generate the more complex pulse repetition patterns used in some radars. Also the selection of scan types described, while useful, is not intended to be an exhaustive catalogue of radar scan types and more, or fewer, or different scan types could easily be provided.

I claim:

1. Radar simulation apparatus comprising a cathode ray tube oscilloscope having a display screen, said oscilloscope having means for producing a movable screen spot, scanning means connected to the oscilloscope for causing the spot to be scanned over the screen in a radar transmitter type scanning pattern, photo-detector means mounted in front of the screen and closely adjacent or on said screen for detecting light from said spot only when said spot is near said photo-detector means and for producing an electrical signal when said light is detected, and modulation means connected to receive and modulate said signal in simulation of a radar pulse repetition.

2. Apparatus as in claim 1 wherein the modulation means comprises a pulse generator for modulating the intensity of the spot on the screen.

3. Apparatus as in claim 1 wherein said photo-detector means comprises an array of photo-sensitive devices having combined outputs whereby a wide radar beam may be simulated.

4. Apparatus as in claim 1 wherein said photo-detector means comprises at least one photo-transistor.

5. Apparatus as in claim 1 further including displacement means associated with said scanning means for displacing the scanning pattern relative to said photo-detector means.

* * * * *